US012097083B2

United States Patent
Awdaljan

(10) Patent No.: US 12,097,083 B2
(45) Date of Patent: Sep. 24, 2024

(54) METHOD AND DEVICE FOR PROVIDING INGREDIENT DATA FOR A PROSTHESIS

(71) Applicant: Gratitude Holding B.V., Veenendaal (NL)

(72) Inventor: Marat Wartanovic Awdaljan, Veenendaal (NL)

(73) Assignee: GRATITUDE HOLDING B.V., Veenendaal (NL)

( * ) Notice: Subject to any disclaimer, the term of this patent is extended or adjusted under 35 U.S.C. 154(b) by 317 days.

(21) Appl. No.: 17/432,735

(22) PCT Filed: Feb. 28, 2020

(86) PCT No.: PCT/NL2020/050134
§ 371 (c)(1),
(2) Date: Aug. 20, 2021

(87) PCT Pub. No.: WO2020/175996
PCT Pub. Date: Sep. 3, 2020

(65) Prior Publication Data
US 2022/0133448 A1    May 5, 2022

(30) Foreign Application Priority Data
Feb. 28, 2019 (NL) ..................... 2022657

(51) Int. Cl.
*A61C 13/08* (2006.01)
*B28B 11/24* (2006.01)
(Continued)

(52) U.S. Cl.
CPC .......... *A61C 13/082* (2013.01); *B28B 11/243* (2013.01); *B28B 17/0072* (2013.01);
(Continued)

(58) Field of Classification Search
CPC ... A61C 13/082; A61C 13/0004; A61C 19/04; B28B 11/243; B28B 17/0072; G01J 3/463; G01J 3/508; G01J 3/462
See application file for complete search history.

(56) References Cited

U.S. PATENT DOCUMENTS 3,436,157 A    4/1969  Adler et al.
6,254,385 B1   7/2001  Jung et al.
(Continued)

FOREIGN PATENT DOCUMENTS

EP    1486901 A2    12/2004
EP    1905350 A1    4/2008
(Continued)

OTHER PUBLICATIONS

International Search Report mailed Apr. 17, 2020, issued in corresponding International Patent Application No. PCT/NL2020/050134 (5 pgs.).

*Primary Examiner* — Edmond C Lau
*Assistant Examiner* — Carlos Perez-Guzman
(74) *Attorney, Agent, or Firm* — Pillsbury Winthrop Shaw Pittman, LLP

(57) ABSTRACT

A method is provided for providing a set of ingredients for manufacturing of a dental prosthesis covering. The method comprises receiving a background colour value providing information on a colour of a background substrate on which the prosthesis is to be provided, receiving an appearance colour value providing information on an appearance colour of the prosthesis and receiving a thickness value providing information on a thickness of the dental prosthesis covering. In an electronic memory, a first ingredient record is looked up comprising first ingredient value, based on the measured background value and the measured appearance colour value. The first ingredient values are adjusted in an electronic processor adjusted based on the thickness value and (Continued)

through electronic output means, the adjusted ingredient data is provided. By adjusting ingredients for thickness, a more natural appearance may be achieved.

19 Claims, 3 Drawing Sheets

(51) Int. Cl.
  *B28B 17/00* (2006.01)
  *G01J 3/46* (2006.01)
  *G01J 3/50* (2006.01)
(52) U.S. Cl.
  CPC .............. *G01J 3/463* (2013.01); *G01J 3/508* (2013.01); *G01J 3/462* (2013.01)

(56) References Cited

U.S. PATENT DOCUMENTS

| | | | |
|---|---|---|---|
| 2003/0222366 A1* | 12/2003 | Stangel | A61C 5/77 264/16 |
| 2008/0160485 A1* | 7/2008 | Touchstone | G01J 3/462 433/215 |
| 2013/0244197 A1* | 9/2013 | Tjioe | G01J 3/0264 433/29 |
| 2014/0372085 A1* | 12/2014 | Korten | A61C 13/0004 703/1 |
| 2020/0000563 A1* | 1/2020 | Specht | A61C 13/0004 |

FOREIGN PATENT DOCUMENTS

| | | |
|---|---|---|
| FR | 2669526 A1 | 5/1992 |
| WO | 98/46008 A1 | 10/1998 |
| WO | 02/076326 A2 | 10/2002 |

\* cited by examiner

METHOD AND DEVICE FOR PROVIDING INGREDIENT DATA FOR A PROSTHESIS

CROSS-REFERENCE TO RELATED APPLICATIONS

This application claims priority to PCT/NL2020/050134, filed Feb. 28, 2020, which in turn claims priority to NL 2022657, filed Feb. 28, 2019, all contents of each of which are hereby incorporated by reference in their entireties.

TECHNICAL FIELD

The various aspects and implementations thereof relate to providing a list of ingredients, in particular quantities, based on an intended appearance of a prosthesis and a dental prosthesis in particular.

BACKGROUND

For determining ingredients for a dental prosthesis, a dentist or other practitioner may compare colour samples to a colour of a tooth or molar in the mouth of a client. The best matching colour sample is selected, which selected sample provides information on ingredients to use for manufacturing the prosthesis of which one hopes it matches colour of remaining elements in the mouth of the client.

Electronic means for determining an intended colour of a prosthesis, like a facing or a crown and in particular the cladding of the latter, are available, but still do not provide ingredient information that provides a prosthesis with a properly matching colour.

SUMMARY

It is preferred to improve existing techniques for providing better colour matching of prostheses. The inventive concept is based on realisation that thickness of the prosthesis and the colour of a background material as a substrate—either natural or artificial—are important factors in the final appearance of a dental prosthesis—or any other prosthesis.

Therefore, in a first aspect, a method is provided for providing a set of ingredients for manufacturing of a dental prosthesis covering. The method comprises receiving a background colour value providing information on a colour of a background substrate on which the prosthesis is to be provided, receiving an appearance colour value providing information on an appearance colour of the prosthesis and receiving a thickness value providing information on a thickness of the dental prosthesis covering. In an electronic memory, a first ingredient record is looked up comprising first ingredient value, based on the measured background value and the measured appearance colour value. The first ingredient values are adjusted in an electronic processor based on the thickness value and through electronic output means, the adjusted ingredient data is provided.

Current methods for providing an ingredient list only use one reference colour, which is the appearance colour of a prosthesis. As discussed, electronic means are available, that may provide data more accurate than mere optical comparison of samples to a tooth by a dentist, but if thickness of the layers of the prosthesis are changed during manufacturing, the finally appearing colour may be different than intended. This change of thickness of the cover layer and the effect thereof on the final appearance colour is not taken into account with other methods, nor is the colour of the background currently taken into account.

The changing of the thickness may be required for fitting the prosthesis properly in the mouth of the applicable person; this depends on the space available. Currently applied methods do not take differences in manufacturing thickness into account and provide ingredients or ingredient layers for only one single thickness, thus ignoring that thickness of layers in the final prosthesis may vary. This issue is addressed by this method.

An implementation of the first aspect further comprises receiving a finish value providing information on a type of enamel finish, wherein the looking up is also based on the finish value.

Dental prostheses usually comprise multiple layers, comprising a layer of opaque dentin and a layer of translucent dentin. The latter layer of the prosthesis may be covered by an additional finish layer, an enamel and/or opal finish. Also further additional layers may be provided, at the top or between various layers.

In another implementation, looking up the first ingredient record comprises looking up the first ingredient record being associated with a first record background colour value matching to the measured background colour value and with a first record appearance colour value matching the measured appearance colour value.

If an ingredient record may be found providing and exactly matching colour, this is preferred to be retrieved, as it can be used without further data processing.

A further implementation further comprises, if in the electronic memory no ingredient record is available having associated thereto a record background colour value being substantially equal to the measured background colour value and a record appearance colour value being substantially equal to the measured appearance colour value: looking up, in the electronic memory, at least a second ingredient record having associated thereto a second background colour value and a second appearance colour value being closest to the measured background colour value and the measured appearance colour value or differing from the measured background colour value and the measured appearance colour value by less than a pre-determined threshold and retrieving the second ingredient record and providing the second ingredient values.

Colour of teeth may be vary endlessly and with proper electronic image acquisition methods, also the acquired colour values may vary endlessly (analogue) or virtually endlessly (digital). This means that, with a finite amount of recipe records, not always a matching record may be found, even when a pre-determined allowed difference is taken into account. If this is the case, a closest available matching record may be selected.

Yet another implementation comprises determining a background difference value between the second background colour value and the measured background colour value, determining an appearance difference value between the second appearance colour value and the measured appearance colour value, adjusting ingredient values of the second ingredient record based on the background difference value and the appearance difference value and providing the adjusted ingredient values.

A more accurate fit may be achieved using extrapolation from one set of ingredient values.

Again a further implementation further comprises looking up, in the electronic memory, at least a third ingredient record having associated thereto a third background colour value and a third appearance colour value being closest to the measured background colour value and the measured appearance colour value or differing from the measured background colour value and the measured appearance colour value by less than a pre-determined threshold. In this implementation, at least one of a first background difference between the third background colour value and the measured background value and a first appearance difference between the third appearance value and the measured appearance value has a sign opposite to at least one of a second background difference between the second background colour value and the measured colour background data and a second appearance difference between the second appearance value and the measured appearance value, respectively. This implementation further comprises determining adjusted ingredient values based on the second ingredient values and the third ingredient values; and providing the adjusted ingredient values.

This implementation applies interpolation for providing an ingredient list that may be used for manufacturing a prosthesis considered as better matching or matching intended colours.

In again another implementation, adjusting the first ingredient values based on the thickness value is based on the law of Lambert Beer.

The effect of a background colour and radiation thereof through transparent, translucent or opaque layers of material may be described using the law of Lambert Beer. One of the variables of this law and being relevant in the underlying physical principle affecting an appearance colour is the thickness of a layer covering a background colour. Taking these effects into account may provide a more natural match.

A second aspect provides a method of manufacturing a dental prosthesis. The method comprises receiving a set of ingredients for manufacturing of the dental prosthesis covering provided in accordance with a method according to the first aspect, obtaining ingredients in accordance with the set of ingredients and manufacturing the dental prosthesis using the obtained ingredients. The method may be executed in a personal electronic assistant, like a smartphone or a tablet computer, but also in a personal desktop or laptop computer or on a remote computer in a data centre, also known as "the cloud".

A third aspect provides a computer programme product comprising computer executable instructions that enable a computer, when the instructions are loaded in the memory, to carry out the method according to any of the first aspect or implementations thereof.

A fourth aspect provides a device for providing a set of ingredients for manufacturing of a dental prosthesis covering. The device comprises a communication unit arranged to: receive a background colour value providing information on a colour of a background substrate on which the prosthesis is to be provided, receive an appearance colour value providing information on an appearance colour of the prosthesis and receive a thickness value providing information on a thickness of the dental prosthesis covering. The device further comprises an electronic memory arranged to store a database comprising ingredient records and a processing unit. The processing unit is arranged to look up, in an electronic memory, a first ingredient record comprising first ingredient value, based on the measured background value and the measured appearance colour value and adjust the first ingredient values based on the thickness value. In this device, the communication unit is further arranged to provide, through electronic output means, the adjusted ingredient data.

BRIEF DESCRIPTION OF THE DRAWINGS

The various aspects and implementations thereof will now be discussed in further details in conjunction with drawings. In the drawings.

DETAILED DESCRIPTION

Figure 1:
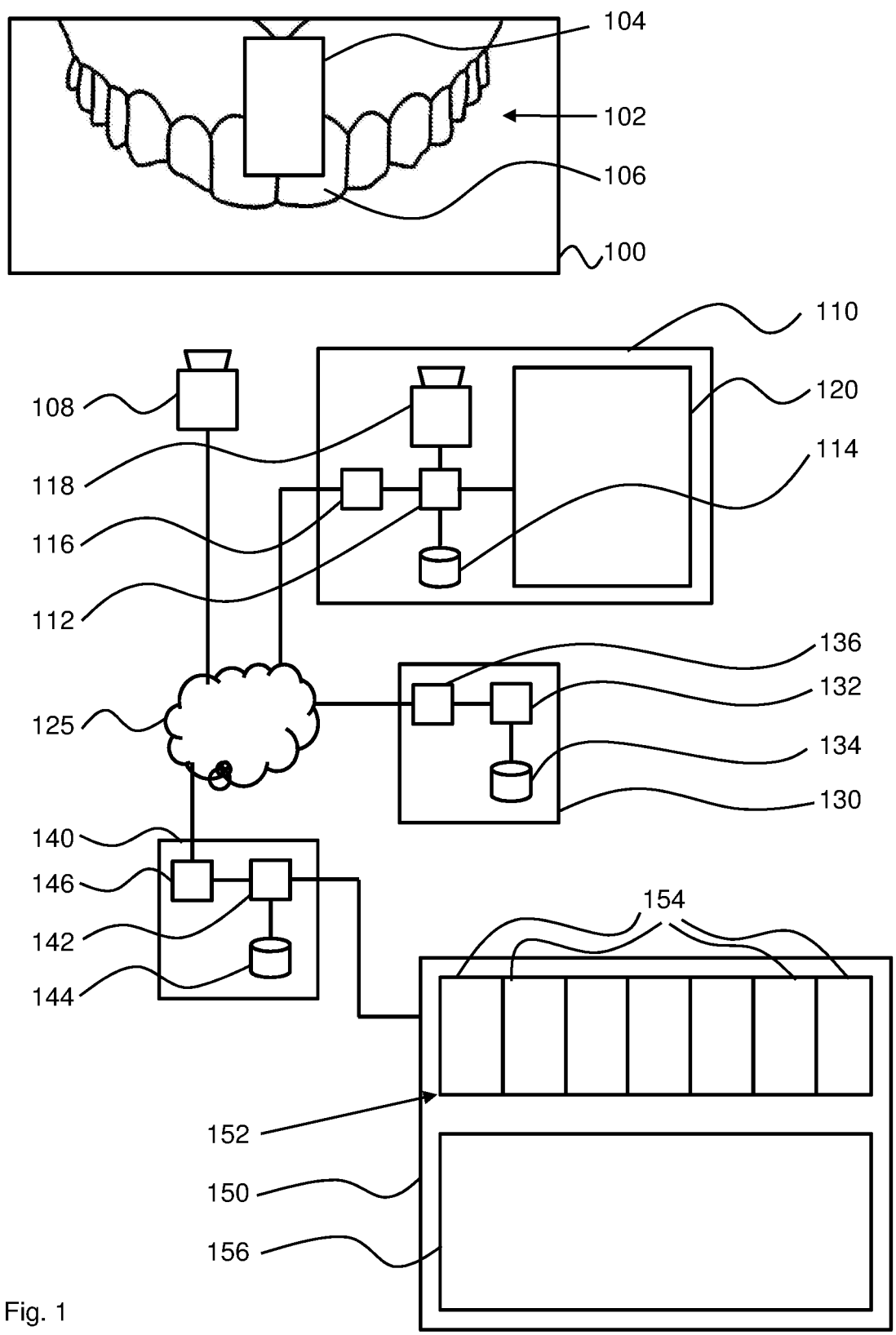
FIG. 1: shows a system for determining ingredient information for the manufacturing of a dental prosthesis.

FIG. 1 shows a camera capture area 100 covering a denture 102. The camera capture area 100 is an area of which a stand alone camera 108 and a smartphone camera 118 of a smartphone 110 as a personal digital assistant or a computing device is positioned to capture image data as a colour sensor. Alternatively, dedicated equipment may be used for acquiring image data, such as a dedicated spectrometer. In the camera capture area 100, a tab 104 having a reference colour is provided. The reference colour is preferably white, though other colours may be envisaged as well. The tab 104 is brought in position close to a tooth 106 of which a colour is to be captured.

The smartphone 110 is, in addition to the smartphone camera 118, provided with a telephone processing unit 112, a telephone memory 114, a telephone communication module 116 and a touchscreen 120. The telephone processing unit 112 is arranged to control the operation of the smartphone 110 and various components thereof, for example to carry out the procedure described below and implementations equivalent thereto. The telephone processing unit 112 may thereto be programmed by means of computer executable code stored in the telephone memory 114. The telephone memory 114 may also be used to store images capture by means of the telephone camera 118.

The smartphone 110 is provided with a touchscreen 120 for presenting a user with visual data and for receiving input from a user for controlling the smartphone 110. Additionally or alternatively, other user interface components may be provided, including, but not limited to buttons, knobs, vibration units, speakers, microphones, other, or a combination thereof. Such input elements may also be used for receiving manual input of colour data related to the tooth 106. An example of this is that a dentist compares the tooth 106 with multiple colour samples and enters a number of a closest matching sample in the smartphone 110, optionally with additional reference data and/or other preferences.

The smartphone 110 is provided with communication module 116 for communicating with other devices, for example over a network 125. The network 125 may be a global network comprising a local and a remote cellular network, a local access point, wired or wireless, a large network backbone, partially or fully based on the TCP/IP protocol, including the so-called internet or another wide area network. The stand alone camera 108 is also arranged to send data via the network 125.

To the network 125, a data storage and processing server 130 is connected. The data server 130 may be a single hardware machine or multiple machines, at one location or distributed over multiple locations. The data server 130 comprises a data communication module 136 for sending and receiving data, a data processing unit 132 for processing data received via the data communication module 136 and/or retrieved from a data storage module 134 as an electronic memory. Furthermore, the data processing unit 132 is arranged to control the various components of the data server 130. To perform these actions, the data processing unit 132 may be programmed by means of computer readable instructions that may be stored in the data storage module 134, for example as a non-transient medium.

A process control computer 140 is connected to the network 125 to receive process ingredient data over the network 125 for manufacturing a dental prosthesis for the denture 102. To this end, the process control computer 140 comprises a process communication module 146 for receiving process ingredient data and optionally further process data. The received data may be further processed by means of a process processing unit 142 and stored in the process storage module 144 as an electronic memory. The process storage module 144 may also store computer executable code for programming the process processing unit 142 to control the process control computer 140 and various components thereof as described below.

The process processing unit is, in FIG. 1, shown in operative communication with a dental prosthesis manufacturing station 150. The prosthesis manufacturing station 150 comprises ingredient storage 152 comprising multiple ingredient storage units 154. The prosthesis manufacturing station 150 further comprises a sintering oven 156 for manufacturing the prosthesis by means of sintering, based on selected amounts of ingredients and further process parameters like thickness, enamel finish, shape, layer thicknesses, the total dimensions of the prosthesis, other, or a combination thereof.

Figure 2:
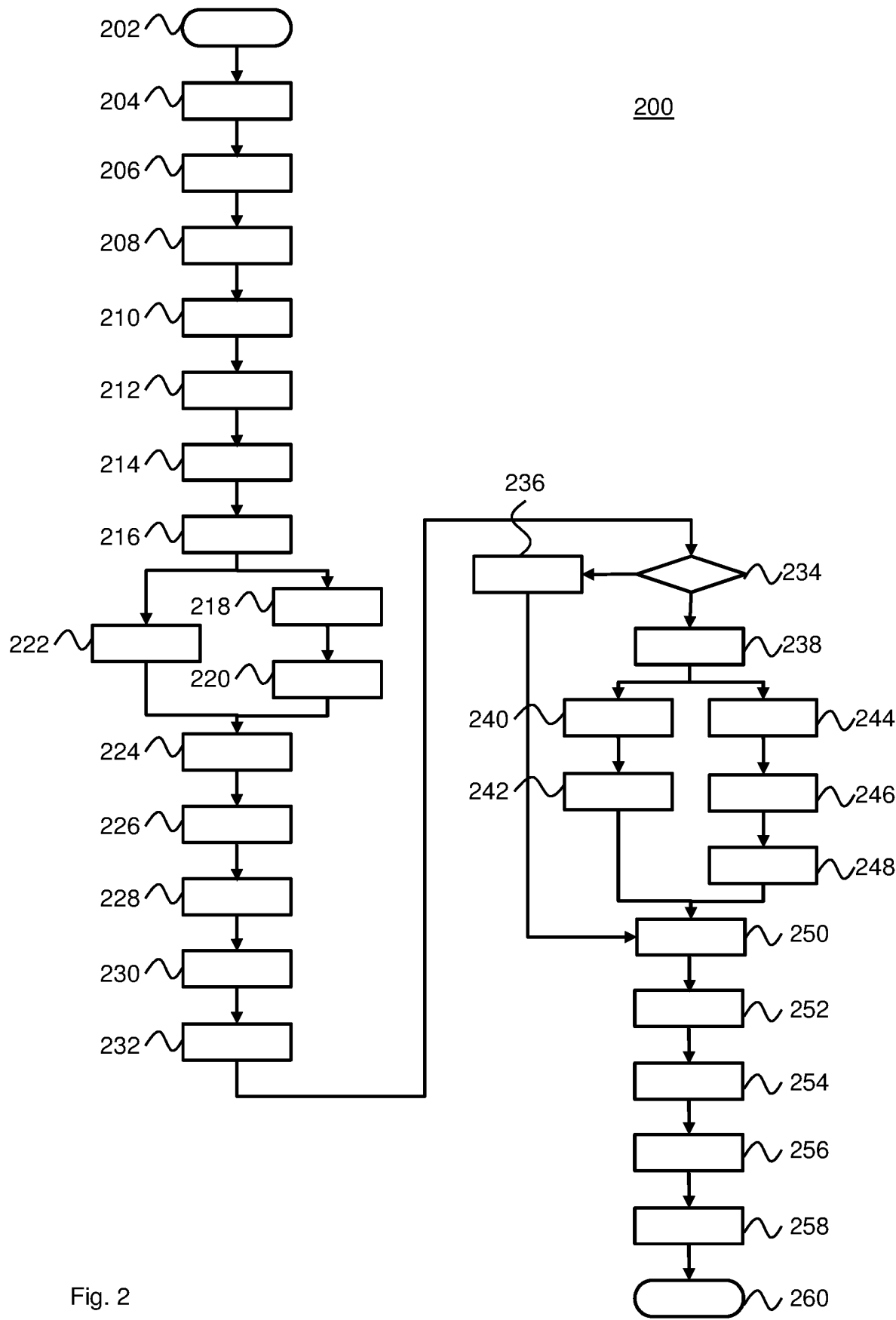
FIG. 2: shows a flowchart depicting a procedure for providing ingredient information for the manufacturing.

FIG. 2 shows a flowchart 200 depicting an implementation of the first aspect. as discussed in the summary section above. The various parts of the procedure are briefly summarised in the following list:

202 start
204 Receive image data
206 Convert to CIELAB
208 Obtain image reference colour
210 Obtain basis reference colour
212 Determine colour correction factor
214 Obtain image foreground colour
216 Correct image foreground colour
218 Obtain image background colour
220 Correct image background colour
222 Obtain artificial background colour
224 Obtain finish data
226 Obtain thickness data
228 Send data query to database
230 Receive query data
232 Search ingredient record with query values
234 Available?
236 Retrieve record with query values
238 Search and retrieve first matching record with matching query values
240 Determine colour distance
242 Correct ingredients composition by extrapolation
244 Search and retrieve second matching record with matching query values
246 Determine colour distances
248 Correct ingredients composition by interpolation
250 Adjust ingredients composition for obtained thickness and colour data
252 Send adjusted ingredients composition
254 Receive adjusted ingredients composition
256 Pick ingredients
258 Manufacture prosthesis
260 end The procedure starts in a terminator 202 and proceeds to step 204 in which image data is received. The receiving of the image data is preferably established by capturing image data by means of either the stand alone camera 108 or the telephone camera 118. In step 206, the image data is, in case required, converted to the CIELAB colour space.

In step 208, reference colour data is acquired from the captured and optionally converted image data. Referring to FIG. 1, this means colour of the tab 104 is acquired by acquiring colour data from an area of the capture image depicting the tab 104.

In step 210, basis reference colour data is obtained. The basis reference colour data provides an indication of an objective colour value of the reference colour and may be retrieved from the telephone memory module 114, the data memory module 134 or another memory module.

In step 212, the image reference colour and the basis reference colour are used to provide a colour correction factor for any colour data acquire from the capture image. The colour correction factor indicates a deviation between the objective colour value of the reference colour and captured colour data of an object—like the tab 104—having the reference colour. The colour correction factor may be used to correct other captured colour values.

Figure 3:
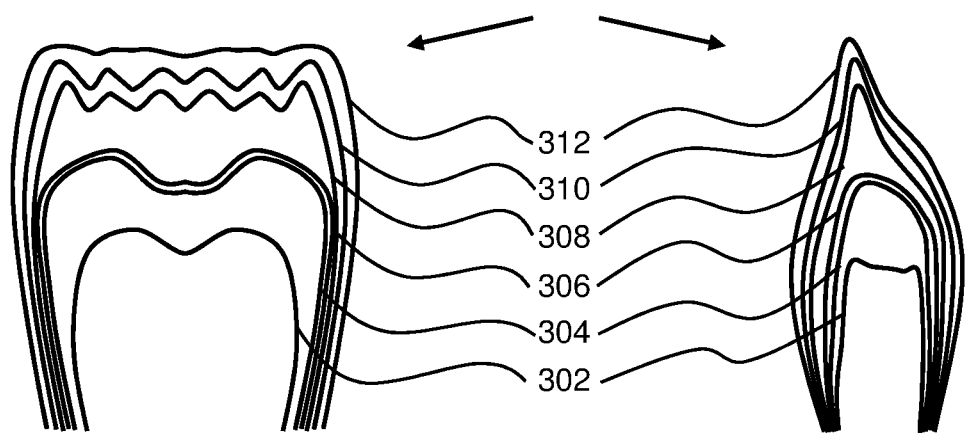
FIG. 3: shows a first cross section of a dental prosthesis and a second cross section of the dental prosthesis.

In step 214, image foreground colour data is obtained from the captured image data. To this end, data selection area information may be received that indicates an area from which a colour is to be obtained. Referring to FIG. 1, a rectangular area of the tooth 106 may be defined; within that area, an average colour data value or mean colour data value may be obtained. In a preferred implementation, colour data is acquired at two locations of the tooth 106. FIG. 3 shows the tooth 106 in further detail, with a first colour acquisition area 322 at a middle area of the tooth 106 and a second colour acquisition area 324 at an incisal area of the tooth 106.

In step 216, the acquired and determined colour value is or colour values are corrected by means of the colour correction factor. Subsequently or in parallel, image background colour data is obtained in step 218 and corrected in step 220. The background colour data may be obtained from the same image from which the foreground colour data is obtained. Alternatively, the foreground colour data is obtained from another image. In that case, a further colour correction factor may be calculated.

In another alternative, an artificial background colour value is obtained in step 222. How the background colour value is obtained depends on the type of prosthesis that is to be manufactured. In case a facing of a tooth is to be manufactured that is to cover an actual tooth, the background on which the facing is to be provided may be best obtained from an image captured from the applicable tooth. If a jacket for a crown is to be manufactured, for covering a cap of the crown, the colour of the cap may be already known as an objective value. In the latter case, no image may have to be acquired and corrected.

With colour data achieved, finish data is obtained in step 224. The finish data comprises in this implantation characteristics of enamel of a prosthesis, optionally based on observations or image data from other teeth. Options may include transparent, translucent, milky, other, or a combination thereof.

In step 226, data related to thickness is obtained. The thickness indicates the total thickness or further dimensions like width of a facing or crown cap. This value, but also other values referenced above, may be received by means of the telephone touchscreen 120 or other input modules of the smartphone 110 or other data inputs of other computing devices.

The obtained data, obtained from captured image data and optionally corrected or obtained through user inputs to the smartphone 110 or other computing device, is provided to the data server 130 in step 228 with the obtained data as query data for querying ingredient data for manufacturing a prosthesis.

In addition to the obtained data, further information may be provided to the data server 130. Such data may include, but is not limited to a specific brand of ceramic ingredients, additional colour or finish data, identification of colour areas on the tooth 106 in the capture area 100, space available for the prosthesis, type of prosthesis, e.g. facing or crown, reference colour specifics, other, or a combination thereof.

It is noted that in another implementation, the acquired image, with the tooth 106 and the tab 104, is sent to the data server 130 and acquisition of colour data values form the image and the adjustment of colour values based on references is executed by the data processing unit 132 of the server 130. The data server 130 receives the query data in step 230 and uses the query data to a search for an ingredient record with the query values in step 232.

An ingredient record comprises data on layers of a dental prosthesis and per layer, one component or ratios of two, three, four or more components. Additionally, data on layer thickness per layer may be provided. FIG. 3 shows possible layers of a dental prosthesis 300 for replacing the tooth 106. At the basis, a tooth base 302 is provided—this is natural material. On the tooth base 302, a cap 304 is provided. The ingredient record may comprise colour data on the cap 304; alternatively, data on the colour of the cap 304 is used in the search query.

The data on thicknesses provided may comprise data per layer, compound thickness of multiple layers, width of the total prosthesis, other, or a combination thereof. With a width of the cap 304 and the width of the total prosthesis 300 known, thickness of further layers may be determined, optionally using foreground colour data and background colour data.

On the cap 304, a staining substrate 306 or coating may be provided. The staining substrate 306 is optional and provides a background colour to subsequent layers and/or functionality like adhesion. On the staining substrate, a layer of opaque dentin 308 is provided. Opaque dentin 308 is opaque, but may, in thin layers, still pass through a colour of the staining substrate 306 or the cap 304. On the opaque dentin 308, translucent dentin 310 is provided and on the translucent dentin 310, a skin enamel 312 may be provided. Optionally, one of the opaque dentin 308 and translucent dentin 310 is provided.

It is noted that additional layers may be provided in an ingredient record as well, including an internal effect layer on the translucent dentin 310 layer, a dentin-enamel connection layer thereon and an opal effect layer on the enamel 312.

Optionally, the ingredient record may comprise data on how to process the various ingredient of the various layers to arrive at a prosthesis, like recipe data.

The query may be preceded with a check whether, based on the received data, it is possible to manufacturing a dental prosthesis matching the colour values provided. The desired thickness of the prosthesis and the brand of ceramic ingredients may be taken into account for this step.

Not all data obtained from user input and/or image data may be taken into account in the query data. In one implementation, only a background colour value and a foreground colour value are used in the query. Alternatively, other data like a colour acquisition protocol or image acquisition protocol, the enamel finish type, the brand of ceramic ingredients, other parameters or a combination thereof may be taken into account in the data query.

It is noted that the image acquisition protocol may later be used for adjustments of colour values or retrieval of data. Furthermore, rather than only one foreground colour data value—preferably adjusted as discussed above—is used for the query, two foreground colour data values are used in the query; a first foreground colour data value for a middle area and a second foreground colour data value for an incisal area of a prosthesis or reference tooth or reference molar.

In step 234 is checked whether an ingredient data record is available in an ingredient database stored on the data memory module 134, which ingredient data record is associated with the foreground colour value(s) and the background colour value of the query—and optionally also other query values like a ceramics brand. The data processing unit 132 may look for an exact match or for an ingredient record associated with values not deviating from the query values with more than a pre-determined threshold. Such threshold may be a fixed threshold, as a value, or a relative threshold, as a percentage. The ingredient database may be set up based on calculations or based on measurement data on numerous sample prosthesis with all different ingredients and layer thicknesses, of which colour data has been acquired.

If such record is found, the applicable record is retrieved in step 236 and sent to the smartphone 120 or the process computer 140 in step 252. An ingredient record, in this implementation, comprises a list with ingredients for one or more layers of a dental prosthesis and more in particular ratios between ingredients for each layer of a ceramic dental prosthesis.

If such ingredient record associated with values of a query appears not to be available, the data processing unit 132 searches for an ingredient data record that best matches the query values in step 238. This means, in this implementation, that an ingredient data record is searched for and retrieved associated with colour data values and optionally also other values that are closest to the query values. Such ingredient data record identifying values may be represented as a data vector, as may the query values be represented as a vector. In this way, difference vectors may be calculated and a record resulting in a difference vector having the smallest size (for example determined by the internal product thereof) may be determined in step 240. Such difference vector may be considered as a colour distance; a distance between colour values in the query and colour value associated with the retrieved ingredient record.

In step 242, based on the colour distance and the ingredient data in the retrieved record, the ingredient values representing ratios between various ingredients are adjusted for the colour distance. Based on the colour distance, ingredient values in the retrieved record may be extrapolated to a data point represented by the query values. This may be a simple linear extrapolation. Alternatively, the law of Lambert Beer may be employed, taking into account translucence of manufactured layers and the effect thereof on the background colour through the layers covering the background.

If the intended layer is to be thinner than the normalised thickness for which ingredients are provided in the database, amount of ingredients or ratios of ingredients may be adjusted to provide a more opaque layer or a layer with more or less of a particular colour forming substance as an ingredient. If the intended layer is thicker, this may work the other way around.

As an alternative to extrapolation, interpolation may be used. In addition to the first retrieved closest or closely matching record, a second closely matching record is searched for and retrieved in step 244. The second closely matching record preferably is associated with colour values located opposite of the colour values of the first retrieved closely matching record, relative to the colour values of the search query.

Values other than colour values may be taken into account as well at this point. It is realised that "opposite" may not be directly visualised in a multi-dimensional space, the second closely matching record is to be associated with values closer to the search query values than to the values associated with the first closely matching record. It may be that the second closely matching record matches better with query values than the first closely matching record.

As an alternative to both interpolation and extrapolation, the background colour may be modified to find a matching record for the foreground colour. In such implementation, the closest matching record—or another closely matching record—may be selected that is preferably closest as possible for the foreground colour. From this record, the background colour is retrieved. This retrieved background colour may subsequently be used for manufacturing the staining substrate 304 having the retrieved background colour.

In step 246, the distances between the search query values and the values associated with the first closely matching record and second are calculated. This may be executed as described above in conjunction with step 240. In step 248, one or two of the colour distances, but also other parameters of at least two of the query values, the ingredient data of the first and second closely matching record and the colour values associated with these records are used to calculated adjusted ingredient parameters.

Having provided an adjusted ingredient list—or having retrieved an exactly matching ingredient list—based on the query values, the ingredients composition is adjusted for the intended thickness of the prosthesis in step 250. In this implementation, all ingredient values in the database are provided associated with specific colour values, with a layer having a normalised thickness, for example one millimetre. If the prosthesis layer is to be one millimetre as well, the retrieved or earlier adjusted ingredient list may be used, with the ratios between various ingredients provided in the record for each layer. If the layer has another thickness, for example a third of a millimetre or two millimetres, the ratios between ingredients in the ingredient list is adjusted or further adjusted for the intended thickness.

Various layers of the prosthesis, like the finish, the colour of any background or substrate the layers are provided on, but also the layer or layers below the finish and their thickness have an effect on the appearance of colour of the prosthesis by a human and this appearance is governed by the law of Lambert Beer. Therefore, the ingredient ratios are preferably adjusted taking into account the physical principles underlying the law of Lambert Beer.

When adjusting the ingredient list—amount of ingredients, ratios between ingredients per layer, optionally recipe data—for the intended thickness of the prosthesis, also the amount of layers may be adjusted. For a very thin prosthesis, like a facing, certain layers like an opal effect layer or a dentin enamel connection layer may be omitted Alternatively, dentin layers are omitted and only an enamel finish layer and opal effect layer are provided.

In the implementation discussed above, with its various options, only one ingredient list is provided. In other implementations, multiple ingredient lists may be provided. In such implementations, ingredient records are retrieved in the same way. The difference between the different ingredient lists may be ceramics brand, number of layers, or a combination thereof. The different ingredient lists provided, based on one and the same data query values, thus providing prostheses with more or less the same colours, may as such provide options with different cost. The number of layers may also be adjusted after providing one ingredient record adjusted for thickness—or before thickness adjustment.

In step 252, the adjusted ingredient list is sent from the data server 130 to the smartphone 110. Additionally or additionally, the list with adjusted ingredients is sent to the process control computer 140. In step 254, the adjusted ingredient list is received by one of or both the process control computer 140 and the smartphone 110. If the ingredient list is received by the smartphone 110 only, they may be sent to the process control computer 140 by the smartphone 110, possibly after user verification. In yet another embodiment, the data communication module 136 sends the adjusted ingredient record data directly to the process control computer 140.

At the process control computer 140, the adjusted ingredient list is received by means of the process communication module 146, preferably together with further information, including, but not limited to, shape and size of the prosthesis. The process processing unit 142 may apply further processing of the data and store the data in the process storage module 144 prior to sending it to the dental prosthesis manufacturing station 150.

At the dental prosthesis manufacturing station 150, the ingredients are picked in step 256 by picking ingredient from the multiple ingredient storage units 154 of the ingredient storage 152 in accordance with the received an optionally further processed ingredient data. With the picked ingredients, the dental prosthesis is manufactured in the sintering oven 156 in step 258, after which the process ends in terminator 260.

The implementation described above, with various options and alternatives, is dedicated to manufacturing of dental prosthesis. Yet, it is noted that, if required, with modifications on the implementation described above, and based on the same inventive concept, also gingiva prostheses and maxillofacial prostheses may be manufactured, including, but not limited to ears, noses and eyes.

Also composite fills for teeth after removal of caries or other dental decay may be manufactured or otherwise prepared following the more general inventive concept of the implementation described above. A reason for this is that these prostheses comprise layers of translucent materials provided on a background—either natural human tissue or bone or artificial—and the appearance of the prostheses depends on the colour of the background, the thickness of one or more layers provided thereon and the composition of these one or more layers.

Whereas the invention so far has been described in conjunction with providing a list for sintering to obtain a ceramic prosthesis, also other techniques may be used for manufacturing of a dental prosthesis, a tooth gum or gingiva prosthesis, a maxillofacial prosthesis or any other prosthesis for replacing, augmenting or correcting any body part. For some body parts, manufacturing methods other than sintering may be preferred, including, but not limited to three-dimensional printing of inks, polymers, monomers forming polymers by curing, for example by heating or exposure to UV radiation, preparation of a mixture of such monomers and/or polymers, moulding of such prosthesis by providing the prepared matter in a mould, milling of a flexible or rigid shape formed by any means, other, or a combination thereof.

The description above may be summarised, in a non-limiting way, by the following numbers implementation examples:

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of providing a set of ingredients for manufacturing of a dental prosthesis covering, the method comprising:
    obtaining image data for a dental prosthesis covering, said image data being captured via a camera configured to acquire said image data;
    receiving background colour data, from said obtained image data, providing information on a colour of a background substrate on which the dental prosthesis is to be provided;
    receiving appearance colour data, from said obtained image data, providing information on an appearance colour of the dental prosthesis;
    receiving a thickness value providing information on a thickness of the dental prosthesis covering;
    using a query in the form of a first data vector for looking up, in an electronic memory, a first ingredient record comprising first ingredient values, said query being based on the received background colour data and the received appearance colour data, and the first ingredient record represented as a second data vector;
    in an electronic processor, adjusting the first ingredient values based on the thickness value; and
    providing, through an electronic output, the adjusted ingredient values for the set of ingredients for manufacturing the dental prosthesis covering.

2. The method according to claim 1, further comprising receiving a finish value providing information on a type of enamel finish, wherein the looking up the first ingredient record is also based on the finish value.

3. The method according to claim 1, wherein looking up the first ingredient record comprises looking up the first ingredient record being associated with first record background colour data matching to the received background colour data and with first record appearance colour data matching the received appearance colour data.

4. The method according to claim 1, further comprising, if the looking up the first ingredient record in the electronic memory yields no result as no ingredient record is available having associated thereto record background colour data being substantially equal to the received background colour data and record appearance colour data being substantially equal to the received appearance colour data:
    looking up, in the electronic memory, at least a second ingredient record having associated thereto second record background colour data and second record appearance colour data being close to the received background colour data and the received appearance colour data or differing from the received background colour data and the received appearance colour data by less than a pre-determined threshold;
    retrieving the second ingredient record and providing the second ingredient values as the first ingredient values.

5. The method according to claim 4, further comprising:
    determining a background difference value between the second record background colour data and the received background colour data;
    determining an appearance difference value between the second appearance colour data and the received appearance colour data;
    adjusting ingredient values of the second ingredient record based on the background difference value and the appearance difference value;
    providing the adjusted ingredient values as the first ingredient values.

6. The method according to claim 4, further comprising:
    looking up, in the electronic memory, at least a third ingredient record having associated thereto third record background colour data and third record appearance colour data being close to the received background colour data and the received appearance colour data or differing from the received background colour data and the received appearance colour data by less than a pre-determined threshold;
    wherein at least one of a first background difference between the third record background colour data and the received background value and a first appearance difference between the third record appearance colour data and the received appearance colour data has a sign opposite to at least one of a second background difference between the second record background colour data and the received background colour data and a second appearance difference between the second record appearance colour data and the received appearance colour data, respectively;
    the method further comprising:
    determining adjusted ingredient values also based on the second ingredient values and the third ingredient values; and providing the adjusted ingredient values as the first ingredient values.

7. The method according to claim 6, wherein determining is further based on the received colour data, the second colour data and the third colour data.

8. The method according to claim 6, wherein determining the adjusted ingredient values comprises interpolation between the second ingredient values and the third ingredient values.

9. The method according to claim 4, further comprising receiving a finish value providing information on a type of enamel finish, wherein the looking up is also based on the finish value, wherein at least one of the looking up and the adjusting of the ingredient values is based on the finish value.

10. The method according to claim 4, further comprising retrieving the second ingredient record a background colour value associated with the second ingredient record; and
providing a background substrate with the background colour value of the second ingredient record.

11. The method according to claim 1, wherein the adjusting the first ingredient values based on the thickness value is based on the principles of the law of Lambert Beer.

12. The method according to claim 1, further comprising receiving measurement protocol data, wherein at least one of the looking up and the determining is also based on the measurement protocol data.

13. The method according to claim 1, wherein the receiving appearance colour data comprises obtaining at least one of a first appearance colour data value related to a middle area of a tooth or the dental prosthesis, a second appearance colour data value related to an incisal area of a tooth or the dental prosthesis and a third appearance colour data value related to a cervical area of a tooth or the dental prosthesis.

14. The method according to claim 1, further comprising:
receiving detected appearance colour data, representing an appearance colour detected by means of a colour sensor;
receiving a detected reference colour value, representing a reference colour detected by means of the colour sensor;
obtaining a basic reference colour value;
determining a colour adjustment value, based on the detected reference colour value and the basic reference colour value;
providing adjusted appearance colour data based on the detected appearance colour data and the colour adjustment value;
executing the method with the adjusted appearance colour data as the received appearance colour data.

15. A method of manufacturing a dental prosthesis, comprising:
receiving a set of ingredients for manufacturing of the dental prosthesis covering provided in accordance with the method according to claim 1;
obtaining ingredients in accordance with the set of ingredients;
manufacturing the dental prosthesis using the obtained ingredients.

16. A non-transitory computer program product comprising computer executable instructions that enable a computer, when the instructions are loaded in the memory, to carry out the method according to claim 1.

17. The device for providing a set of ingredients for manufacturing of a dental prosthesis covering, the device comprising:

a communication unit arranged to:
receive image data for a dental prosthesis, said image data being captured via a camera configured to acquire said image data;
receive background colour data, from said obtained image data, providing information on a colour of a background substrate on which a dental prosthesis is to be provided;
receive appearance colour data, from said obtained image data, providing information on an appearance colour of the dental prosthesis;
receive a thickness value providing information on a thickness of the dental prosthesis covering;
an electronic memory arranged to store a database comprising ingredient records; and
a processing unit arranged to:
use a query in the form of a first data vector for looking up, in an electronic memory, a first ingredient record comprising first ingredient values, said query being based on the received background value and the received appearance colour data, and the first ingredient record represented as a second data vector;
adjusting the first ingredient values based on the thickness value;
wherein the communication unit is further arranged to provide, through an electronic output, the adjusted first ingredient values for the set of ingredients for manufacturing the dental prosthesis covering.

18. The method according to claim 1, further comprising looking up, in the electronic memory, a second ingredient record comprising second ingredient values, the second ingredient record represented as a third data vector, the second ingredient values having associated therewith a second record background colour data and second record appearance colour data, said second ingredient values not deviating from values in the query by more than a pre-determined threshold and being represented as a third data vector;
determining a colour distance in the form of a difference vector between colour values in the first data vector of the query and the third data vector of the second ingredient values in the second ingredient record;
adjusting the ingredient values of the second ingredient record further based on the colour distance; and
providing the adjusted ingredient values of the second ingredient record as the first ingredient values which are adjusted based on the thickness value and provided for the set of ingredients for manufacturing the dental prosthesis covering.

19. The device according to claim 17, wherein the processing unit is further arranged to:
look up, in the electronic memory, a second ingredient record comprising second ingredient values, the second ingredient record represented as a third data vector, the second ingredient values having associated therewith a second record background colour data and second record appearance colour data, said second ingredient values not deviating from values in the query by more than a pre-determined threshold and being represented as a third data vector;
determine a colour distance in the form of a difference vector between colour values in the first data vector of the query and the third data vector of the second ingredient values in the second ingredient record;
adjust the ingredient values of the second ingredient record further based on the colour distance; and provide the adjusted ingredient values of the second ingredient record as the first ingredient values which are adjusted based on the thickness value and provided for the set of ingredients for manufacturing the dental prosthesis covering.

\* \* \* \* \*